July 16, 1940.  E. W. FORSTROM  2,208,453

DRIVE MECHANISM

Filed Feb. 23, 1938

Inventor:
Edward W. Forstrom,
by Harry E. Dunham
His Attorney.

Patented July 16, 1940

2,208,453

UNITED STATES PATENT OFFICE 2,208,453

DRIVE MECHANISM

Edward W. Forstrom, Stratford, Conn., assignor to General Electric Company, a corporation of New York Application February 23, 1938, Serial No. 191,865

11 Claims. (Cl. 74—10)

My invention relates to driving mechanisms and more particularly to driving mechanisms for controlling the variable circuit elements of radio apparatus such as tuning condensers and the like. It has for one of its objects to provide certain improvements in such driving mechanisms to facilitate the adjustment of such mechanism either manually or by motor.

In tuning systems for radio receivers as now commonly employed the tuning condenser is driven either by a motor, which is controlled in response to operation of certain manually controlled switches, or push buttons, and also manually as by manipulation of a knob mounted on a shaft which is engageable with a driving element of the tuning device. It is desirable that the manual drive be disconnected from its driving connection with the tuning condenser whenever the condenser is driven by the motor in order that the load on the motor, which determines the size and cost of and impairs to a certain extent the operation of the motor, may be held at a minimum value. It is also desirable that the moving parts of the motor be quickly disconnected from their driving connection with the condenser as soon as the latter has been adjusted to a desired setting since otherwise the relatively great inertia of the motor's moving parts cause the condenser to over shoot a desired adjustment.

It is therefore an object of my invention to attain these desirable objectives in a drive arrangement which is simple in construction, reliable in operation, and one which may readily be adapted for use with the tuning element of any radio apparatus.

A further object of my invention is to provide a drive having an arrangement of elements which accomplish in an automatic manner the individual and selective connection of a manual or a motor drive with the tuning elements of a radio apparatus.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 shows in elevation an embodiment of my invention employed to adjust an element of a signalling apparatus, and Fig. 2 is a partial view of certain elements to illustrate a step in the operation of this embodiment.

Figure 1:
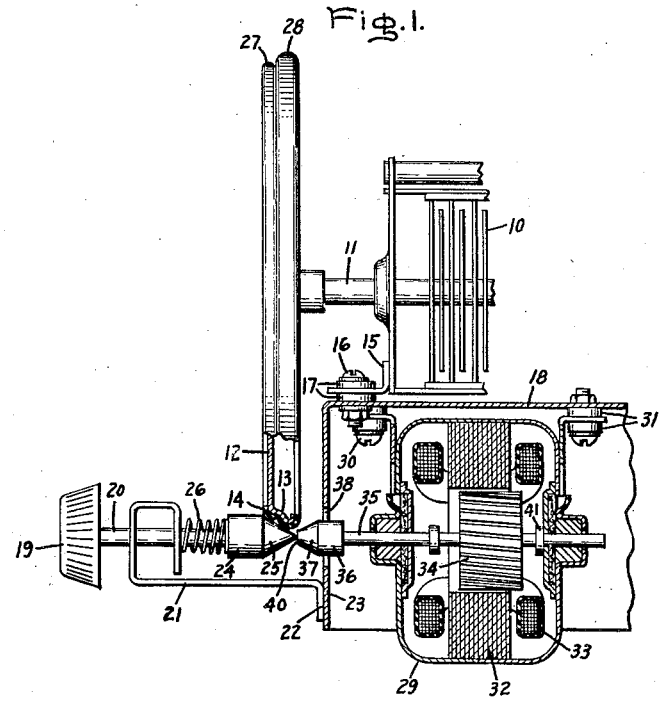
Figure 2:
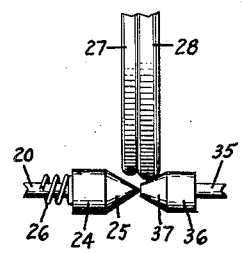

Referring particularly to Fig. 1 of the drawing, my invention is shown by way of illustration as embodied in an arrangement for adjusting the tuning element 10 of a signalling apparatus which may be either a receiver or a transmitter of signal oscillations. The apparatus is provided with a circuit element 10 as, for example, a tuning condenser, having a shaft 11 which supports on its left-hand end a friction gear 12. The friction gear 12 has a periphery 13 to which may be secured a resilient material 14 of soft rubber or the like for the purpose of providing a driving surface having a high coefficient of frictional resistance. The condenser 10 is supported by a plurality of feet 15 (only one of which is shown in the drawing), by machine screws 16 and by resilient washers 17 to a chassis 18 used to support other elements (not shown) of the signalling apparatus.

At the extreme left of Fig. 1 is shown a knob 19, which may be manually grasped by an operator in effecting a desired adjustment of the circuit element 10. This knob is supported on the left-hand end of a shaft 20 which is journaled for both rotational and axial movement in a bracket 21 secured by welding or other suitable means at 22 to a downturned flange 23 of the chassis 18. A friction gear 24 is fixedly secured on the right-hand end of the shaft 20. The gear 24 has a conical friction surface 25 normally biased by a helical spring 26 into contact with the driving surface of the gear 12. The driving surface of the gear 12 may be constituted by two portions 27, 28 of different diameter to provide a gear ratio for one driving source, which may drivingly engage the portion 27, different from that for a second driving source in driving engagement with the portion 28. It will be evident that the ratio of the mechanical drive thus provided between the shaft 20 and the condenser shaft 11 is determined by the ratio between the mean diameter of the friction surfaces of the gears 12 and 24 where they are in contact.

A motor driven adjustment of the tuning condenser 10 may be accomplished by the provision of an electric motor 29 secured as by machine screws 30 and resilient washers 31 to the lower side of the chassis 18. The motor 29 has field poles 32 energized by field windings 33 from a suitable control circuit, not shown, and has an armature 34 which is supported by a shaft 35 for axial movement into and out of alignment with the field poles 32. Secured to the left-hand end of the motor shaft 35 is a friction gear 36 having a conical friction surface 37. The motor shaft 35 and gear 36 extend through an aperture 38 provided in the downturned flange 23 of the chassis 18 to engage the driving surface 28 of the gear 12 whenever the motor armature 34 moves axially into near alignment with the motor field poles 32. The ratio of the mechanical drive thus provided between the motor shaft 35 and the condenser shaft 11 is determined by the ratio of the mean diameter of the frictional surfaces of the gears 12 and 36 where they are in contact. It will be evident that the gear ratio between the motor shaft 35 and the condenser shaft 11 will be greater, with the construction here shown, than that between the shaft 20 and the shaft 11.

When my invention is employed in the particular embodiment here illustrated, it is necessary that the moving parts of the actuating motor be quickly disconnected from their driving connection with the circuit element as soon as the latter is moved to a desired adjustment. Otherwise the relatively large inertia of the motor armature 34 will cause the circuit element to overrun the position in which it should have stopped. To this end, the manually actuated shaft 20 and the motor shaft 35 are supported coaxially with the apex of the conical surface 25 extending to the right of the driving surface 28 into abutting relation with the flattened end portion 40 of the gear 36. This construction insures that only one of the gears 24 or 36 engages the gear 12 at any one time and further enables the helical spring 26 to bias the gear 36 quickly out of engagement with the gear 12 when the motor 29 is deenergized after a desired adjustment of the condenser 10 has been effected. The point contact between the gears 24 and 36 provides a thrust bearing having a minimum surface in frictional contact to allow either the shaft 20 or the motor shaft 35 to rotate freely and independently of the other. A conjoint movement of the shafts axially results from the direction in which the spring biasing force is applied to the shaft 20 and the magnetic force is applied to the shaft 35. A collar 41 is suitably positioned on the motor shaft 35 to limit the axial movement of the armature 34 to a minimum consistent with firm engagement between the gear 24 and the driving surface 27 of the gear 12.

The operation of my mechanical drive arrangement will now be obvious from the above description. The spring 26 normally biases the gear 24 into engagement with the driving surface 27 of the gear 12 and movement of the knob 19 is thus transmitted in reduced ratio to the tuning condenser shaft 11. The motor 29 at this time is deenergized and its armature 34 is, as shown in Fig. 1, biased under influence of the helical spring 26 to one side of an aligned position with the field poles 32 with the motor shaft 35 and gear 36 in a normally deenergized or idling position.

An adjustment of the tuning condenser 10 by operation of the motor 29 is accomplished by energizing the motor 29 through a suitable control circuit, not shown, whereupon the magnetizing force exerted by the field poles 32 upon the armature 34 causes the latter to move to the left against the bias of the helical spring 26 to effect a closer alignment between the field poles 32 and the armature 34. The motor shaft 35 and gear 36 move with the armature to a driving position in which the gear 36 is in engagement with the driving surface 28 of the gear 12. The gear 24 is conjointly moved by the gear 36 out of driving engagement with the gear 12, in the manner shown by Fig. 2 of the drawing, and the gear 24 and shaft 20 are now in an inoperative or idling position where any movement of the control knob 19 is no longer transmitted to the condenser shaft 11. The magnetic force that pulled the armature 34 toward alignment with the field poles 32 also produces a rotational movement of the armature in a direction determined by the external connections of the field windings 33 in the motor control circuit, not shown. Rotation of the motor shaft 35 is thus transmitted in reduced ratio to the tuning condenser shaft 11. It may be noted that the armature 34 does not move into exact alignment with the field poles 32 upon energization of the motor since a slight displacement of the armature to the right of the field poles is necessary to insure the existence at all times during operation of a force acting to move the gear 36 axially into firm driving engagement with the periphery of the driven gear 12.

After the motor 29 has driven the tuning condenser shaft 11 to effect a desired setting of the condenser 10, the motor is deenergized whereupon the magnetic force exerted by the field poles 32 upon the armature 34 no longer exists and the armature moves under influence of the spring 26 to the right out of alignment with the field poles. The gear 36 quickly moves to the right out of engagement with the gear 12 and in moving allows the gear 24 once more to reestablish the normal driving connection of the knob 19 with the condenser shaft 11.

The thrust bearing between the gear 24 and the gear 36 serves during the operation of my drive arrangement not only to space apart the frictional surfaces 25 and 37 of the respective gears 24 and 36, but also provides a selective drive operation which allows either the shaft 20 or the shaft 35 to be operated independently of movement of the other.

It will, of course, be evident that the frictional type of gearing which I have illustrated herein may be replaced by a toothed form of gearing or by a constantly meshed system of gearing operating in conjunction with clutches positioned to be actuated by the axial movement of the driving shafts. Further, while I have shown a thrust bearing between the gear 24 and the gear 36 to provide a selective drive operation, I wish it to be understood that this is by way of illustration only and that the desired selective drive may be accomplished by other well known means, as, for example, by forming the gears 24 and 36 into a single gear having the same contour as the individual gears or by a system of pivoted links connecting the gear 24 to the gear 36 in a manner to move the gears conjointly in an axial direction.

While I have shown a particular embodiment of my invention, it will of course be understood that I do not wish to be limited thereto since many modifications may be made both in the mechanical arrangement and the instrumentalities employed, and I therefore contemplate by the appended claims to cover any such modifications as fall within the true spirit and scope of my invention.

What I claim as new and desire to secure by Letters Patent of the United States is:

1. The combination, in a mechanical drive, of a driven member, a first driving member normally biased in the absence of applied driving power into driving relation therewith, a second driving member normally biased in the absence of applied driving power out of driving relation with said driven member, said second driving member having a driving motor connected thereto, and means responsive to the energization of said motor for breaking the driving connection of said first driving member with said driven member and for connecting said second driving member in driving relation with said driven member.

2. The combination, with a radio receiver having an adjustable tuning element, of means for adjusting said element, an axially movable shaft drivingly connectable to said means, a motor having an axially movable shaft drivingly connectable to said means, and means responsive to the energization and deenergization of said motor for moving said shafts conjointly in an axial direction selectively to complete the driving connection of said second named or said first named shaft respectively to said first named means.

3. An actuator for the tuning mechanism of a radio receiver comprising, in combination, a tuning element, a driven member connected to said element, a first driving member, a second driving member having an electric driving motor connected thereto, said motor including a field and an armature, means for supporting said armature in a normal position laterally opposite with respect to said field, said means permitting of axial movement of said armature toward alignment with said field by the force exerted when said field is energized, means for returning said armature to said normal position immediately upon deenergization of said field, and means responsive to the axial movement of said armature toward or away from alignment with said field for alternately connecting said second and said first driving member respectively to said driven member.

4. In combination, a radio receiver tuning element, a manually controlled shaft axially movable from a normal position to a second position, means for connecting said shaft in its said normal position to said tuning element, a motor shaft movable from a normal position to a second position, means for connecting said motor shaft in its said second position to said tuning element, and means responsive to the energization of said motor for conjointly moving said shafts axially to their said second positions.

5. A control for a radio receiver having an adjustable element comprising, in combination, a gear connected to said adjustable element, a first driving shaft axially movable to a driving and an idling position, said shaft having a gear arranged to engage said first named gear when said shaft is in its said driving position, a second driving shaft axially movable to a driving and an idling position, said second named shaft having a gear arranged to engage said first named gear when said shaft is in its said driving position, means connecting said shafts for conjoint movement alternately to their said driving positions, and means for moving said shafts in said conjoint movement.

6. A tuning control for a radio receiver having a tunable element comprising, in combination, a friction gear connected to said tunable element, said gear having concentric driving surfaces of larger and smaller diameter spaced axially apart, a manually controlled shaft axially movable to a driving and an idling position, means including a friction gear on said shaft and utilizing one of said driving surfaces for connecting said shaft in said driving position to said tunable element, a motor shaft axially movable to a driving and an idling position, means including a friction gear and utilizing the second of said driving surfaces for connecting said motor shaft in said driving position to said tunable element, and means for conjointly moving said shafts axially to selectively position either shaft in its said driving position with the other shaft in its said idling position.

7. A tuning control for a radio receiver having a tunable element comprising, in combination, a friction gear connected to said tunable element, said gear having concentric driving surfaces of larger and smaller diameter spaced axially apart, a manually controlled shaft axially movable to a driving and an idling position, means including a friction gear on said shaft and utilizing one of said driving surfaces for connecting said shaft in said driving position to said tunable element, a motor having a shaft axially movable to a driving and an idling position, means including a friction gear on said motor shaft and utilizing the second of said driving surfaces for connecting said motor shaft in said driving position to said tunable element, means positioning said shafts in axial alignment, and means including an axially aligned thrust bearing between said shafts for conjointly moving said shafts axially while maintaining said gears spaced axially apart a distance greater than the axial spacing of said driving surfaces.

8. In a tuning control for a radio receiver having an adjustable tuning element, a driven member connected to drive said tuning element, a first and a second driving member each axially movable into and out of driving engagement with said driven member, means to bias said driving members to one position in which one of said driving members engages said driven member and the other driving member is disengaged therefrom, and means responsive to drive of the other of said driving members for effecting axial movement of both of said driving members to move said one driving member out from engagement with said driven member and to engage in driving relation said driven member and said other driving member, said bias means being operative upon discontinuance of said drive to restore said driving means to said one position.

9. In a control for a radio receiver having an adjustable element, the combination of a driven member connected to drive said adjustable element, a manually actuated driving member, a motor actuated driving member, means including an axially movable shaft biased to one axial position for drivingly engaging said manually actuated driving member with said driven member, means including a second shaft axially movable against the bias of said first shaft in response to the operation of said motor for drivingly engaging said second named driving member with said driven member and actuating said first shaft against its bias, to disengage said manually actuated driving member from said driven member, whereby upon deenergization of said motor said shafts are operated under said bias to engage said manually actuated member with said driving member and to disengage said motor actuated driving member from said driven member.

10. In combination, a pair of axially movable shafts arranged in endwise engagement, driving gears mounted on the respective shafts in proximity to their engaged ends, a driven gear positioned for engagement with one or the other of said driving gears dependent upon the axial position of said shafts, means to bias one of said shafts to one position in which one driving gear engages said driven gear and the other driving gear is disengaged therefrom, and means operative upon drive of the other driving gear to move said shafts axially against said bias to disengage said one driving gear from said driven gear and engage said other driving gear with said driven gear.

11. In combination, a pair of substantially conical friction gears arranged on respective coaxial shafts with their conical faces adjacent, said gears being in axial engagement, a driven friction gear positioned therebetween for engagement with the conical face of one or the other of said gears, means to bias one of said driving gears against said driven gear and to bias the other driving gear away therefrom, and means operative upon drive of the other driving gear to actuate said conical gears against said bias to move said other driving gear in engagement with said driven gear and to move said one driving gear away therefrom.

EDWARD W. FORSTROM.